US012754138B2

(12) United States Patent
O'Brien, III et al.

(10) Patent No.: US 12,754,138 B2
(45) Date of Patent: Oct. 6, 2026

(54) DEVICE FOR PROVIDING TOTAL TRICHOME COUNT AND DENSITY OF CANNABIS INFLORESCENCES

(71) Applicant: CHUBBY CAT, INC., Portland, OR (US)

(72) Inventors: Robert Vincent O'Brien, III, Portland, OR (US); Jon Chappell, Portland, OR (US)

(73) Assignee: Chubby Cat, Inc., Portland, OR (US)

( * ) Notice: Subject to any disclaimer, the term of this patent is extended or adjusted under 35 U.S.C. 154(b) by 621 days.

(21) Appl. No.: 18/127,254

(22) Filed: Mar. 28, 2023

(65) Prior Publication Data

US 2023/0314333 A1 Oct. 5, 2023

Related U.S. Application Data

(60) Provisional application No. 63/326,849, filed on Apr. 2, 2022.

(51) Int. Cl.
*G01N 21/84* (2006.01)

(52) U.S. Cl.
CPC ..... *G01N 21/84* (2013.01); *G01N 2021/8466* (2013.01); *G01N 2201/0216* (2013.01)

(58) Field of Classification Search
CPC ........... G01N 2021/8466; G01N 21/84; G01N 2201/0216
See application file for complete search history.

(56) References Cited

U.S. PATENT DOCUMENTS

| | | | | |
|---|---|---|---|---|
| 5,497,188 | A * | 3/1996 | Kaye | H04N 7/185 348/36 |
| 2005/0029426 | A1* | 2/2005 | Washick | A47G 33/126 248/523 |
| 2018/0276818 | A1* | 9/2018 | Vander Velden | H04N 23/681 |
| 2020/0327326 | A1* | 10/2020 | Gavish | G06F 18/24143 |
| 2022/0357634 | A1* | 11/2022 | Jin | G01J 3/0237 |

OTHER PUBLICATIONS

Lazcano-Ramirez ("Non-destructive Plant Morphometric and Color Analyses Using an Optoelectronic 3D Color Microscope"). Front. Plant Sci. 9:1409. doi: 10.3389/fpls.2018.01409 (Year: 2018).*

* cited by examiner

*Primary Examiner* — Jennifer Wecker
*Assistant Examiner* — Jonathan Bortoli
(74) *Attorney, Agent, or Firm* — Zuber Lawler LLP

(57) ABSTRACT

A device consisting of a digital camera with a microscope objective lens, a disc where plant material can be mounted and automatically rotated, and two other cameras for determining the plant material's shape and size, that allows images of intact *cannabis* trichomes to be taken, without destruction or damage to the plant material, and automatically counts and calculates the density of the trichomes on the inflorescence surface. This does not require taking any plant cuttings, does not require the use of a microscope or microscope slides, and allows multiple measurements to be taken of a single inflorescence sample in quick succession, without the need for manual image analysis.

5 Claims, 16 Drawing Sheets

DEVICE FOR PROVIDING TOTAL TRICHOME COUNT AND DENSITY OF CANNABIS INFLORESCENCES

CROSS-REFERENCE TO PRIOR APPLICATIONS

The present application is based on and claims the priority and benefit of U.S. Provisional Patent Application No. 63/326,849, filed on 2 Apr. 2022.

U.S. GOVERNMENT SUPPORT

N/A

BACKGROUND OF THE INVENTION

Area of the Art

The present application is in the area of botanical and agricultural sciences and is more specifically directed to a device and method for measuring trichomes on the inflorescences of *Cannabis* plants.

DESCRIPTION OF THE BACKGROUND ART

*Cannabis* is a genus of dioecious flowering plants in the Cannabaceae family. *Cannabis* is widely grown for both fiber and medicinal purposes. As a dioecious plant there are both "male" (pollen bearing) and "female" (seed bearing) plants. Mile both male and female plants are used for fiber production, only the female plants have significant medicinal properties because they contain high concentrations of cannabinoids and other active plant products. The inflorescence of the female plant bears insignificant, wind pollinated flowers within a dense terminal raceme (often secondarily or tertiarily branched) bearing multiple floral bracts. The inflorescence often has a rounded surface formed by the primary, secondary and higher order racemes; *cannabis* cultivators often refer to this structure as "flower" or "buds." The floral bracts are densely covered with glandular trichomes-mushroom-shaped epidermal structures consisting of several stalk cells with a large spherical cap. The cap consists of large secretory cells which are thought to be the major sites of cannabinoid as well as terpene biosynthesis. Cavities within the trichome cap act as reservoirs for the synthesized cannabinoids and terpenes. Trichomes, thus, make significant contributions to the psychoactive properties, appearance, smell, and taste of *cannabis*. It is therefore important for *cannabis* growers and scientific researchers to understand the relationship between trichome traits and the desirable properties of the plant. However, the current state-of-the-art method of measuring trichome traits is to manually count them through a microscope. This task is rarely performed due to its tediousness and potential for human error. Scientific knowledge of the relationship of trichome size and density on the properties of the *cannabis* plant is therefore inadequate.

Glandular trichomes are visible to the naked eye; although they are too small to count without magnification. However, lenses with high magnification are sufficient to enable counting of the trichomes. Using digital image capture technology, the problem of counting trichomes can be vastly simplified by applying a machine learning algorithm. An example of using a machine learning algorithm to automatically count plant trichomes can be seen in the publication Mirnezami et al., "Automated trichome counting in soybean using advanced image-processing techniques," *Applications in Plant Sciences,* 2020 8 (7): e 11375. In this report, the authors took leaf cuttings from soybean plants and chemically cleared them before mounting them onto a microscope slide for imaging. The imaged trichomes were then automatically counted using image processing software. This method would not be practical for trichome counting on *cannabis* inflorescences for a number of reasons, including: 1) the destructive nature of the method requires sacrificing valuable product thereby limiting the scope of measurements; 2) the required use of advanced microscopy methods requires special expertise and training; and 3) *cannabis* inflorescences cannot easily be mounted to a slide due to their dense three dimensional structure—an accurate trichome count requires observing the entire surface of the inflorescence, not just a cleared bract. Other inventions have tried to address the issue of accurate imaging of microscopic plant features such as trichomes, including Yarden (US20190033210), in which plant spectrophotometric measurements of plant features are captured and automatically processed, and an automated, movable microscopy system described by Yakamoto (US20170329123). However, neither of these inventions allows for automated, accurate trichome counting, which would be a vital tool for *cannabis* cultivation.

Due to the difficulty of obtaining accurate trichome counts, *cannabis* cultivators do not typically measure the total trichome count or trichome density of the *cannabis* inflorescences they grow. Since the trichomes are the primary site of cannabinoid biosynthesis, the quantity of trichomes may be directly correlated with increased potency of the *cannabis* inflorescence, and the correlation will be even stronger when varying agronomic conditions to promote increased trichome production within a single cultivar ("strain" in *cannabis* parlance). For example, when growing a particular cultivar of *cannabis*, if a fertilizer combination was found to increase trichome count, this would also increase the total $\Delta^9$-tetrahydrocannabinol ($\Delta^9$-THC) content of the inflorescence. In general, cultivars with more trichomes will tend to be more potent than cultivars with fewer trichomes. These data are thus extremely important for *cannabis* breeding and optimization of agronomic conditions yet are currently unavailable to *cannabis* cultivators due to the impracticality of manually counting trichomes.

Although users trained in microscopy could take the time to manually count trichomes, such trichome count data will only be meaningful when a large number of inflorescences are measured. This is due to the inherent variation in the traits of *cannabis* plants, even when the plants are grown under essentially identical conditions. For example, if one plant gets slightly less light or slightly less water than a neighboring plant, this can lead to a decreased expression of trichomes on the flower bracts. To address this inherent variation, many inflorescences of the same cultivar would have to be measured, an unfeasible task given the time required to manually observe a *cannabis* inflorescence under a microscope and manually count each trichome.

Therefore, there is a need for an automatic trichome counting device that allows non-destructive determination of the total trichome count and trichome density of *cannabis* inflorescences. There is also a need that such a device allows rapid counting, so that data can be collected from a large quantity of inflorescence samples to obtain an accurate representation of the phenotype of the *cannabis* cultivar. Finally, there is a need that this device be simple enough to use that a cultivator does not need any special education or training to obtain meaningful data.

SUMMARY OF THE INVENTION

The present invention comprises a device (a "trichome scanner"), consisting, in a preferred embodiment, of a digital camera with a microscope objective lens, a disc or platform where plant material can be mounted and automatically rotated, and at least one additional camera for determining the plant material's shape and size. The device allows images of intact *cannabis* trichomes to be taken, without destruction or damage to the plant material. The captured images are then automatically parsed by image analysis software that determines the total trichome count and estimates the trichome density of the sample; the trichome count and density values can be displayed (for example on a liquid crystal display-LCD-screen) for the user to read or can be relayed electronically to a quality control system. In an alternative embodiment, the flower sample is placed onto a fixed platform and the camera is mounted on a wheel that allows the camera to rotate around the flower while taking images.

Besides providing an automatic trichome tally for judging the quality of a *Cannabis* inflorescence, the invention also provides a measurement of "trichome availability." Some uses of *Cannabis* rely on trichomes isolated from the inflorescence. The trichomes are harvested using mechanical techniques to detach the trichomes from the bracts of the inflorescence. It is understood in the *Cannabis* art that some inflorescences, while having an extremely high trichome density, provide a relatively poor yield of detached trichomes. This is largely a result of hindrance caused by the spacing of the floral bracts. In its simplest form a *Cannabis* inflorescence can be pictured as a central stem with more or less closely spaced nodes. At each node the axillary bud develops into a secondary branch containing one or more floral bracts which subtend the pistillate "female" flowers. Where the intermodal distance is relatively large, the majority of trichomes can be readily detached. Where the intermodal distances are relatively small, the total inflorescence is "tight" and the overlapping floral can inhibit harvest of trichomes. The inventive trichome scanner measures the internodal distances in the inflorescence and provides an index that predicts the ability to harvest trichomes from the inflorescence.

DETAILED DESCRIPTION OF THE INVENTION

Figure 1:
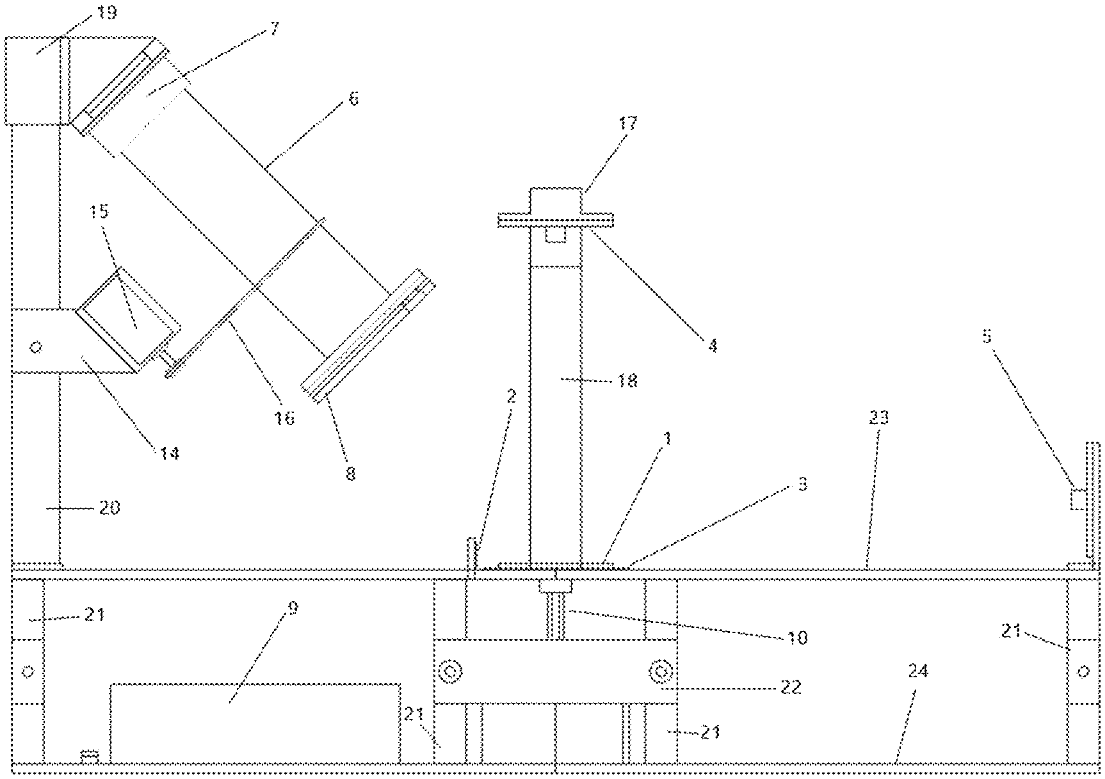
FIG. 1 is a diagrammatic side view of the interior of one embodiment of the inventive trichome scanner.

The following description is provided to enable any person skilled in the art to make and use the invention and sets forth the best modes contemplated by the inventors of carrying out their invention. Various modifications, however, will remain readily apparent to those skilled in the art; the general principles of the present invention have been defined herein specifically to provide an automated trichome counter particularly well-suited for measurement of glandular trichomes on *Cannabis* inflorescences.

The terminology used herein is for the purpose of describing specific embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context dearly indicates otherwise. It will be further understood that the terms "comprises" and/or "comprising", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and shall not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

A trichome scanner device that allows automatic counting of trichomes on *cannabis* inflorescences is discussed herein. In the following description, for purposes of explanation, numerous specific details are set forth to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the drawings or description. Distances, angles, and other measurements are provided in a range that is practical for the device operation and are not intended to limit the invention to any specific embodiments or dimensions. Unless otherwise noted, all components of the device could be fabricated of resin, plastic, metal, wood, or any other inert material that will not interact with the resinous surface of a *cannabis* inflorescence.

Figure 4:
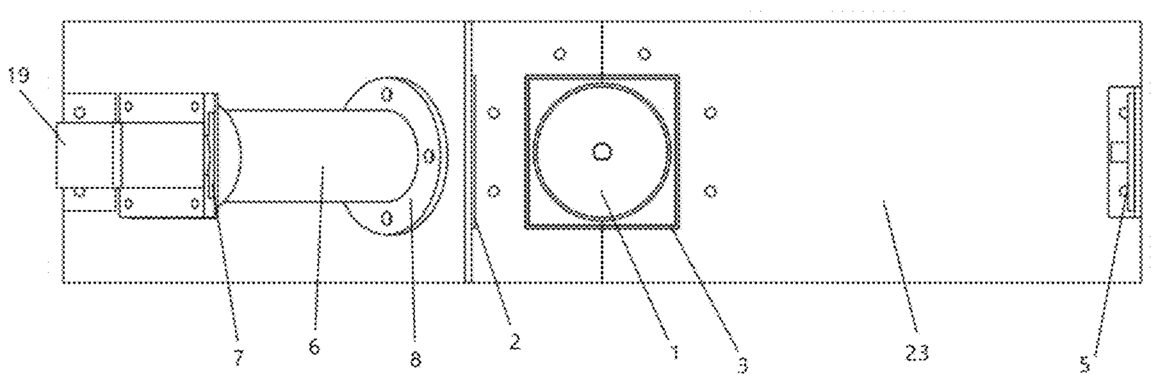
FIG. 4 is a plan top-down view of the interior of one embodiment of the trichome scanner.
Figure 5:
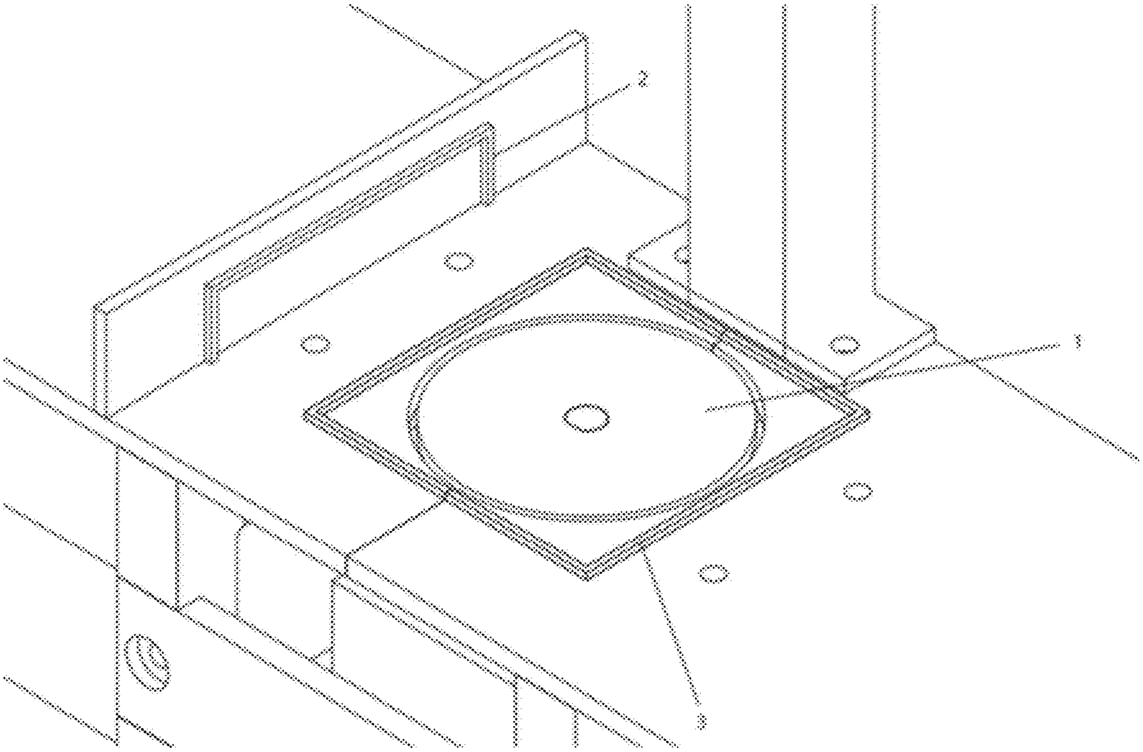
FIG. 5 is a close-up diagram of the platform and calibration areas of one embodiment of the trichome scanner.

The present invention will now be described by referencing the appended drawings representing preferred embodiments. FIGS. 1-4 depict multiple perspectives of the interior of the device, including a diagrammatic side view (FIG. 1), isometric views (FIGS. 2 and 3) and a plan top-down view (FIG. 4). In a preferred embodiment of the device, a rotating platform 1 rests in the center and consists of a circular disc with a diameter in the range of about 30-60 mm. It will be apparent to one of ordinary skill in the art that the optimal diameter of the disc is influenced by the average inflorescence size of the cultivars being measured. A rectangular panel 2, fixed alongside one edge of the rotating disc 1, is engraved with vertical calibration markings. The dimensions of the rectangular panel 2 are about 40-70 mm wide by about 20-40 mm high; in a preferred embodiment, the dimensions are 70 mm×40 mm. The rotating disc 1 is set into a square panel 3, engraved with horizontal calibration markings. The sides of the square panel may range in length between about 40-70 mm, depending on the diameter of the platform 1; in a preferred embodiment, the dimensions are about 70 mm×70 mm. FIG. 5 shows components 1-3 in more detail.

As shown in FIG. 1, a first camera 4 is mounted directly above the platform 1, vertically aligned with the sample at a distance ranging from about 100-150 mm; in a preferred embodiment the first camera 4 is mounted about 150 mm from the platform 1. The object distance for the first camera 4 should be in the range of about 80-120 mm; a typical lens for a working distance of 80 mm with a ⅓" sensor will have a 6 mm focal length. A second camera 5 is mounted horizontally, perpendicular to the axis of the rotating platform 1 at a distance of about 150-180 mm from the panel 2; in a preferred embodiment, the second camera 5 is about 180 mm from the panel 2. The object distance for the lens of the second camera 5 should be in the range of 100-120 mm; a typical lens for a 100 mm working distance and ⅓" image sensor will have a 12 mm focal length.

The second camera 5 is attached to a horizontal mount 17, which is attached to a column 18. The mount 17 is a rectangular block about 10-15 mm in height, about 15-20 mm long, and about 50-80 mm deep; in a preferred embodiment, the mount 17 is about 15 mm high, 20 mm long, and 80 mm deep. The column 18 is also a rectangular member about 10-15 mm deep, about 15-20 mm long, and about 100-150 mm in height; in a preferred embodiment, the column 18 is about 15 mm high, about 20 mm long, and about 150 mm high.

A microscope objective lens 6 is positioned opposite the second camera 5, aimed diagonally at the plant sample mounted on the rotating disc 1. The working distance for the microscope lens should be in the range of about 80-100 mm, with a lens diameter of 25-40 mm. At the top of the microscope objective lens 6 a high-quality third camera 7 is installed, with a minimum of 5 MP resolution and ¼" to ⅔" sensor size. At the bottom of the microscope objective lens 6, a ring light 8 is mounted, with an interior diameter in the range of about 25-40 mm to match the lens diameter, with an exterior circle diameter about 15-20 mm larger than the interior diameter; in a preferred embodiment the microscope objective lens outer diameter and the ring light interior diameter are both about 40 mm, and the ring light exterior diameter is about 60 mm.

The high-quality camera 7 is mounted atop a column 20 of height ranging between about 100-150 mm; in a preferred embodiment the column 20 has a height of about 150 mm. In a preferred embodiment, a camera mount 19 has square dimensions of about 22 mm long by about 35 mm high by about 24 mm deep (see FIGS. 2 and 3 for different perspective views of this component) for mounting to the column 20, with an additional triangular face wherein each side is about 20 mm in length, with a depth of about 24 mm. The camera mount 19 is positioned atop the column 20, which is fastened to the top panel 23 of the device, which is a plate that is about 150-180 mm in length and about 70-100 mm in depth; in a preferred embodiment the top panel 23 is about 180 mm long and about 100 mm deep. The bottom panel (base) 24 of the device is identical in construction to the top panel 23.

Figure 6:
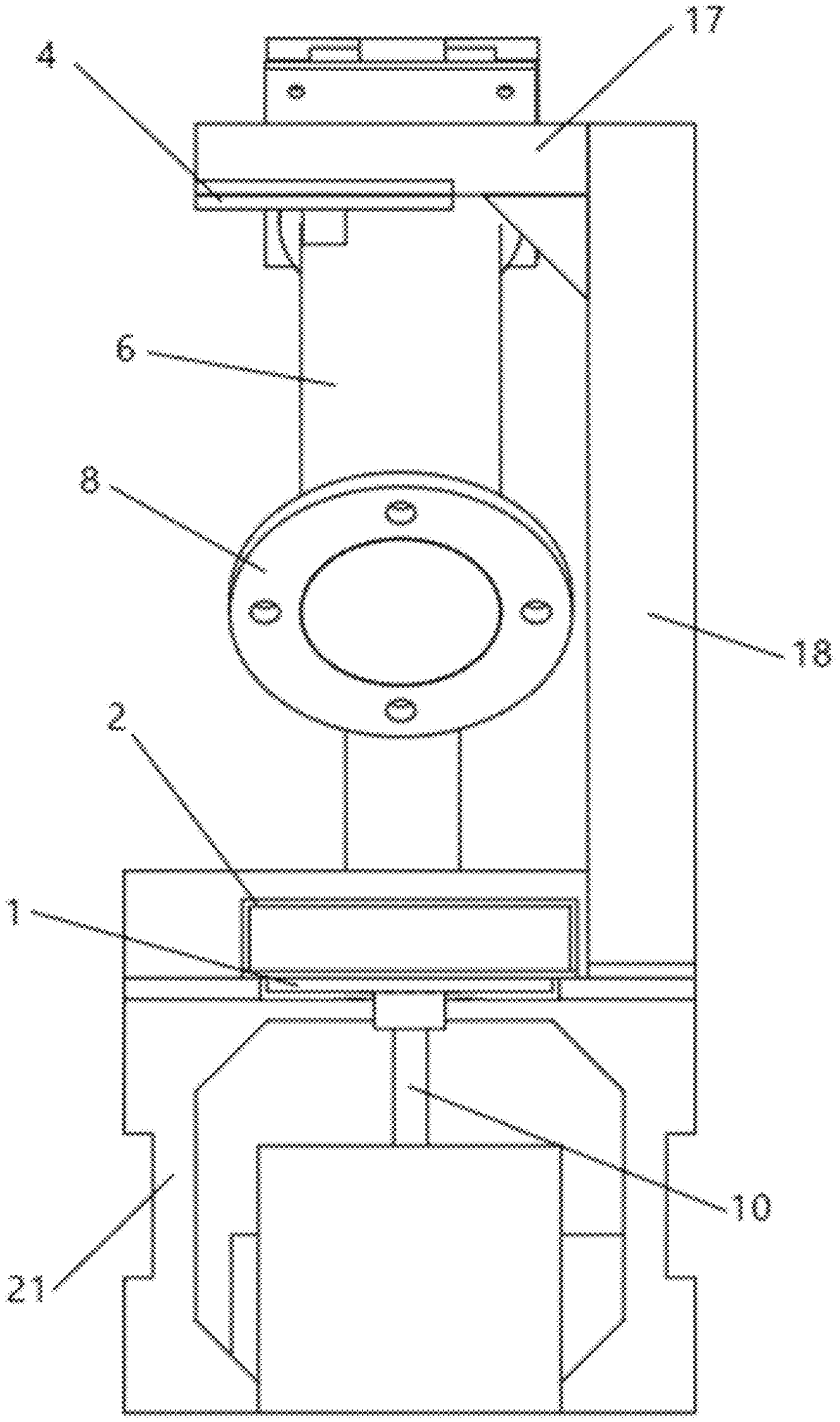
FIG. 6 is a cutaway side-view center showing one embodiment of the stepper motor and microscope objective lens configuration.

Four bridging members 21, connect the bottom panel 24 and the top panel 23, via screws. Each member 21 is rectangular, with dimensions ranging from about 70-100 mm in depth, about 50-70 mm in height, and about 10-15 mm length (thickness); in a preferred embodiment, this component is about 100 mm deep, about 70 mm tall, and about 15 mm thick. Two of these bridging members 21 are installed on either side of a stepper motor 10, and at opposite ends of the top panel 23 and the bottom panel24; each member 21 includes an octagonal opening in the center (80 mm wide in a preferred embodiment) to allow adequate airflow for the motor 10 and Single-Board Computer (SBC) 9. The two interior components 21 are connected by two braces 22, to join the two parts of the base panel 24, together. FIG. 6 is a side view center cutaway that shows the configuration of the stepper motor 10 in more detail.

Cables (not shown) connect the cameras 4, 5, 7, the ring light 8, and the stepper motor 10 to the SBC 9. In a preferred embodiment the SBC 9 runs the Raspberry Pi OS operating system (OS), or some other similarly configured OS. Short-range and long-range wireless technologies (e.g., Bluetooth and WiFi, respectively) can also be employed. The SBC or similar computing device can be Internet-connected and may be located outside of the enclosure containing the other components of the system.

The vertical and horizontal cameras 4 and 5 (as well as high-quality camera 7) image the inflorescence using the ring light 8 for illumination. The calibration areas 2 and 3 are visible in the images and the calibration markings are used for automatic calibration of the cameras by removing areas of the image outside of the calibration lines. This allows the system to continue to function properly even if the cameras become slightly misaligned due, for example, to handling and transportation of the machine.

Figure 2:
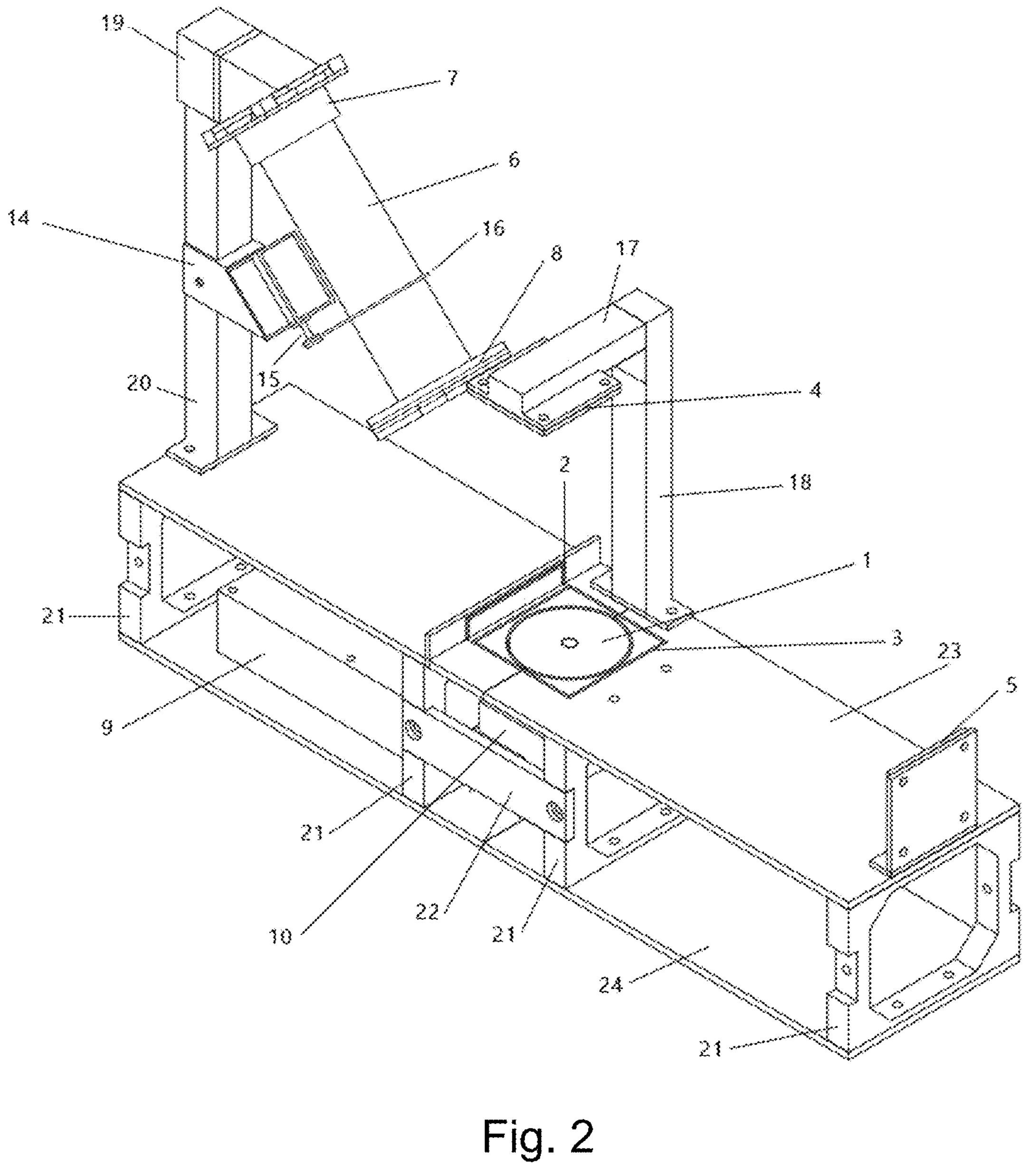
FIG. 2 is an isometric view of the interior of one embodiment of the trichome scanner.
Figure 3:
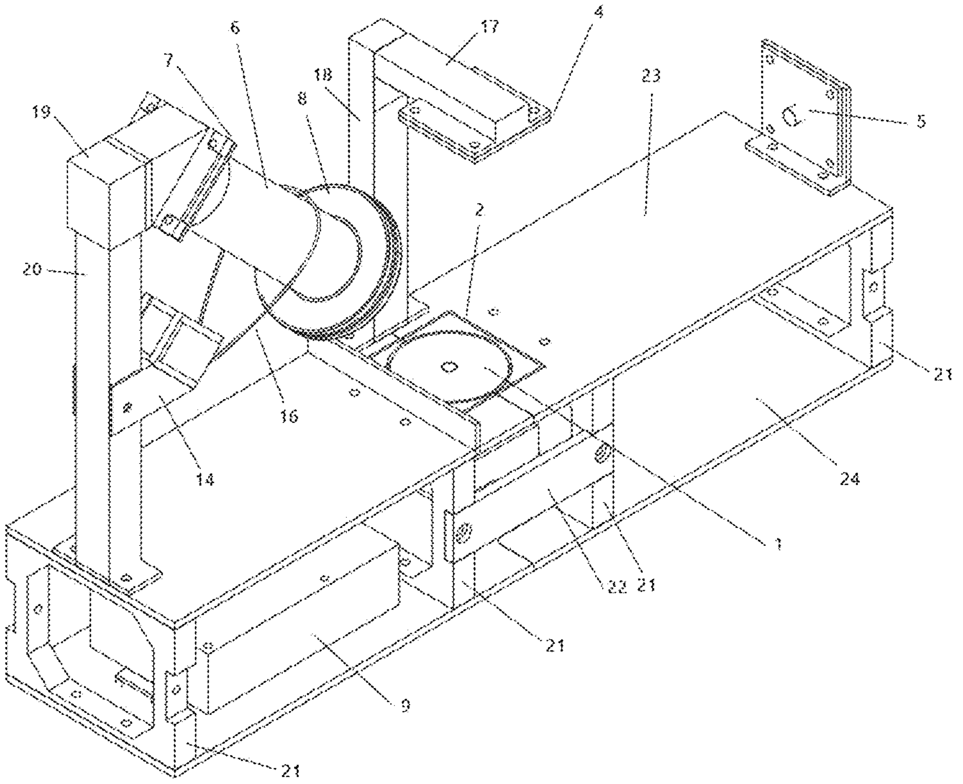
FIG. 3 is an isometric view of the interior of the embodiment of FIG. 2, showing areas obscured in FIG. 2.

As shown in FIGS. 1-3, the focus motor 15 is mounted on a mount 14, connected to the barrel of the microscope objective lens 6 via a band 16, allowing the device to programmatically adjust the focus of the lens 6 by rotating the focus motor 14 which is positioned about 60-110 mm above the top panel 23. In a preferred embodiment the mount 14 is 110 mm above the top panel 23. Due to the long focal length of the lens 6, the range of positions in which the inflorescence is in focus is extremely narrow, so the focus may need to be adjusted to accommodate the user not placing the inflorescence precisely in the center of the rotating platform 1. To do this, the device captures multiple images with the camera 7 through the microscope objective lens 6 and adjusts the lens focus via the motor 15 between each image capture. The number of trichomes in each photograph is compared and the image with the highest number of visible trichomes is used to set the focus of the lens.

Figure 7:
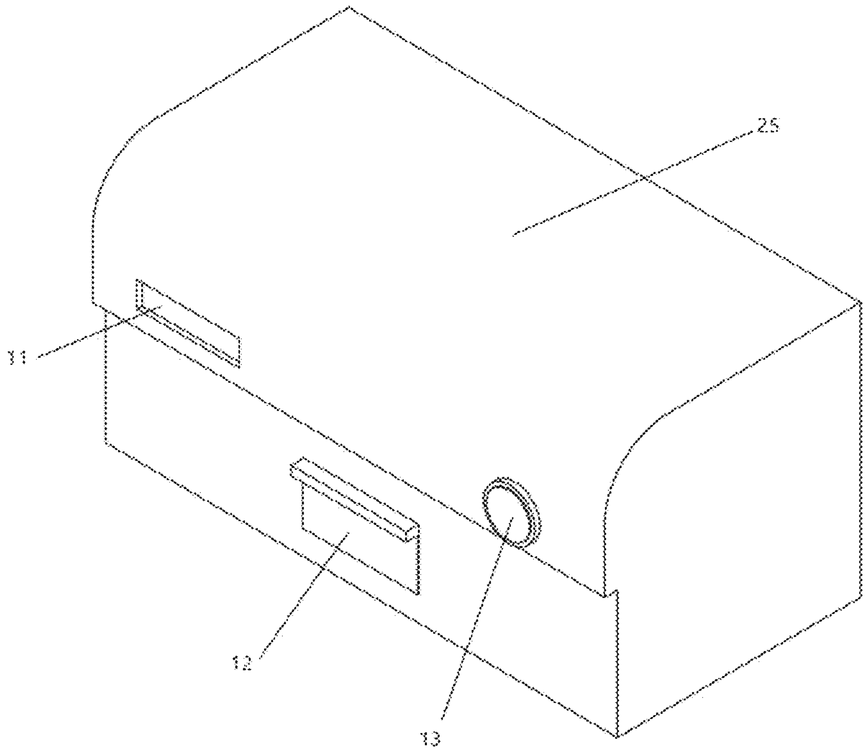
FIG. 7 is an isometric view of the exterior of one embodiment of the trichome scanner, showing the external controls.

As shown in FIG. 7, the user opens an entry door 12, places a harvested inflorescence from a *cannabis* plant onto the rotating platform 1, closes the door 12 and then presses the button 13 to start the imaging and measuring operation. The entry door 12 may range in size from about 40-80 mm in length and about 40-60 mm in height; in a preferred embodiment, the door will be 80 mm long and 60 mm high. The button 13 is a momentary contact switch and in a preferred embodiment has a diameter of about 25 mm. After multiple measurements have been performed, the system outputs the results on the LCD display 11. In a preferred embodiment the LCD display 11 is alphanumeric with four lines and 16-20 characters per line. Dimensions of the display 11 range from about 60-80 mm in length and about 20-40 mm in height; in a preferred embodiment the LCD screen 11 is 80 mm long, 40 mm high and 20 characters wide. Alternative embodiments could use a graphical LCD or TFT display capable of higher resolution output. The LCD display screen 11 and the button 13 are connected to SBC 9 through interior cables (not shown). The LCD display screen 11 can be an off-the-shelf component such as a 20×4 alphanumeric display controlled by a controller such as an HD44780.

Figure 11:
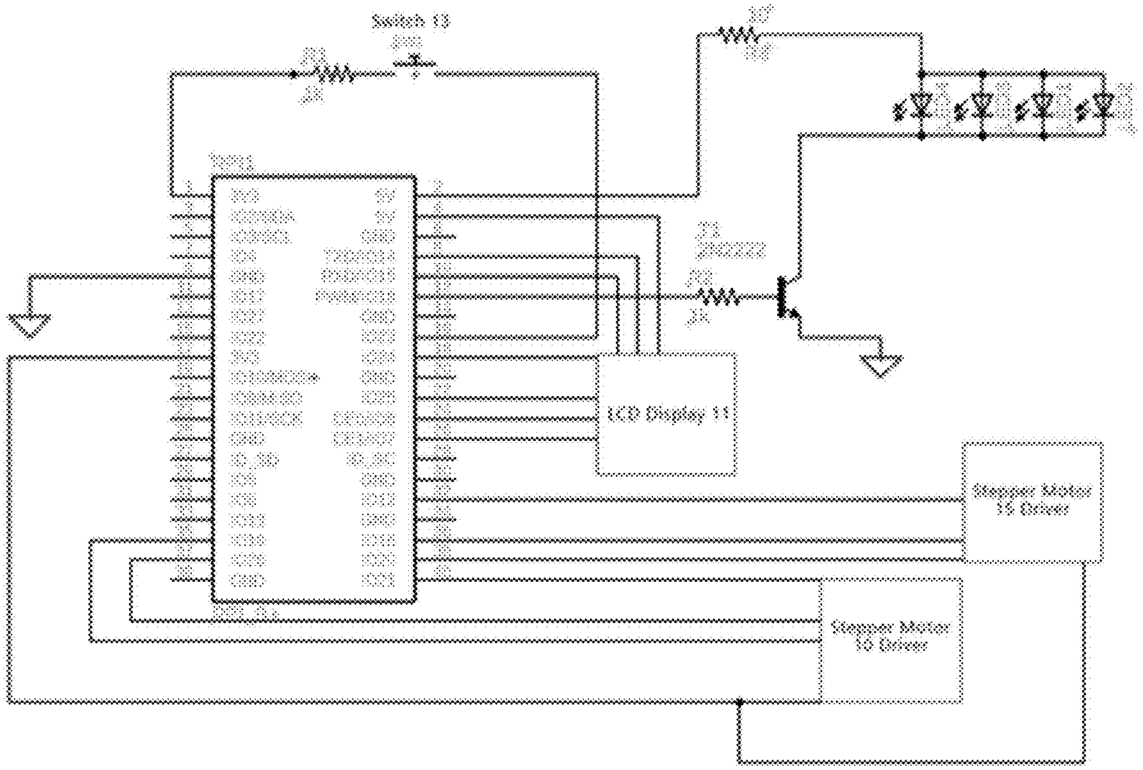
FIG. 11 is a circuit diagram showing the connections between the electrical components of the device and the onboard computer.

FIG. 11 shows how the components can be connected and controlled by the General-Purpose Input-Output (GPIO) pins on the SBC 9. The user presses the switch 13 which triggers an input event on GPIO 23 (pin 16) on the SBC 9. Software running on the SBC sets pin 12 (GPIO 18) to high, which triggers transistor $T_1$ to power LEDs 1-4 to illuminate the ring light 8. It then sends pulses to alternately trigger the coils in the stepper motor 15 which adjusts focus of the lens 6. (Not pictured is the motor controller board, which can be an off-the-shelf component powered by a chip such as a DRV8833 or L293D.)

The device then images the inflorescence with the camera 7 connected to the SBC's built-in camera port (not pictured). The horizontal and vertical alignment cameras 4 and 5 are connected to the SBC's built-in USB ports (not pictured). It will be appreciated that various connections can also be made via wireless technologies using short-range networking such as Bluetooth or local networks such as RS 232 or wide area networks such as the Internet. There could also be multiple SBCs to control different components, such as a separate SBC solely for image capturing or motor control. After the image has been captured, the SBC pulses the stepper motor 10 to rotate the inflorescence before capturing another image. After a series of images have been captured across the entire circumference of the plant sample, the trichome density is calculated by the software and the value is then output on the LCD display 11.

The interior chassis of the device is covered by a protective cover, and in a preferred embodiment this cover is about 270 mm in height, 440 mm in length, and 160 mm in depth at the base. In the preferred embodiment, the top lid 25 of the cover has a curved face that is indented at 240 mm from the base of the cover, with a lip that extends 10 mm beyond the depth of the base (maximum depth of 170 mm front to back). In the preferred embodiment, the entry door 12 is positioned in the center of the lower portion of the top panel, 180 mm from each side, and the center of door 12 is 85 mm from the bottom of the device.

Figure 8:
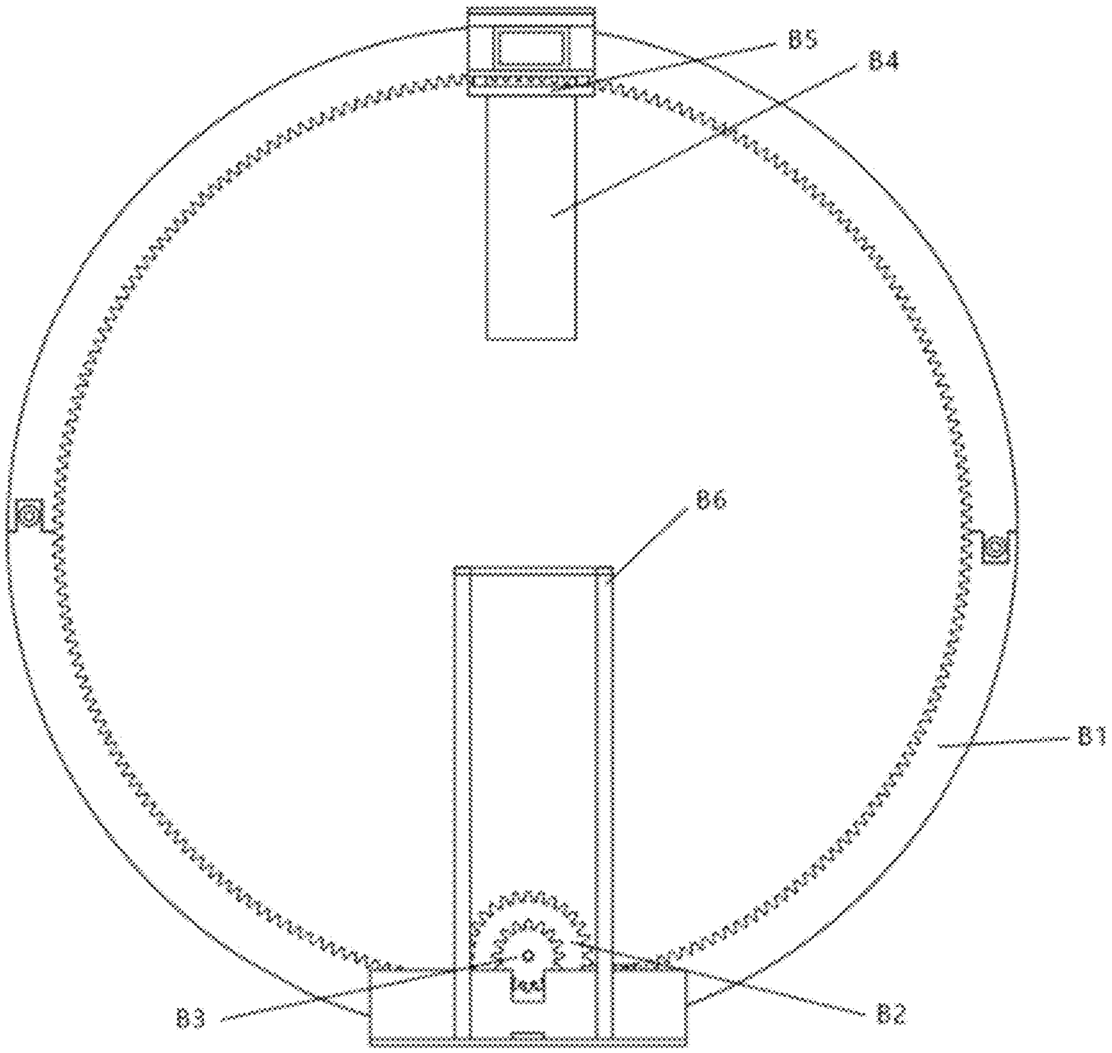
FIG. 8 is a front view of an alternative embodiment, in which the mounted inflorescence remains in a fixed position while the camera rotates around it.
Figure 9:
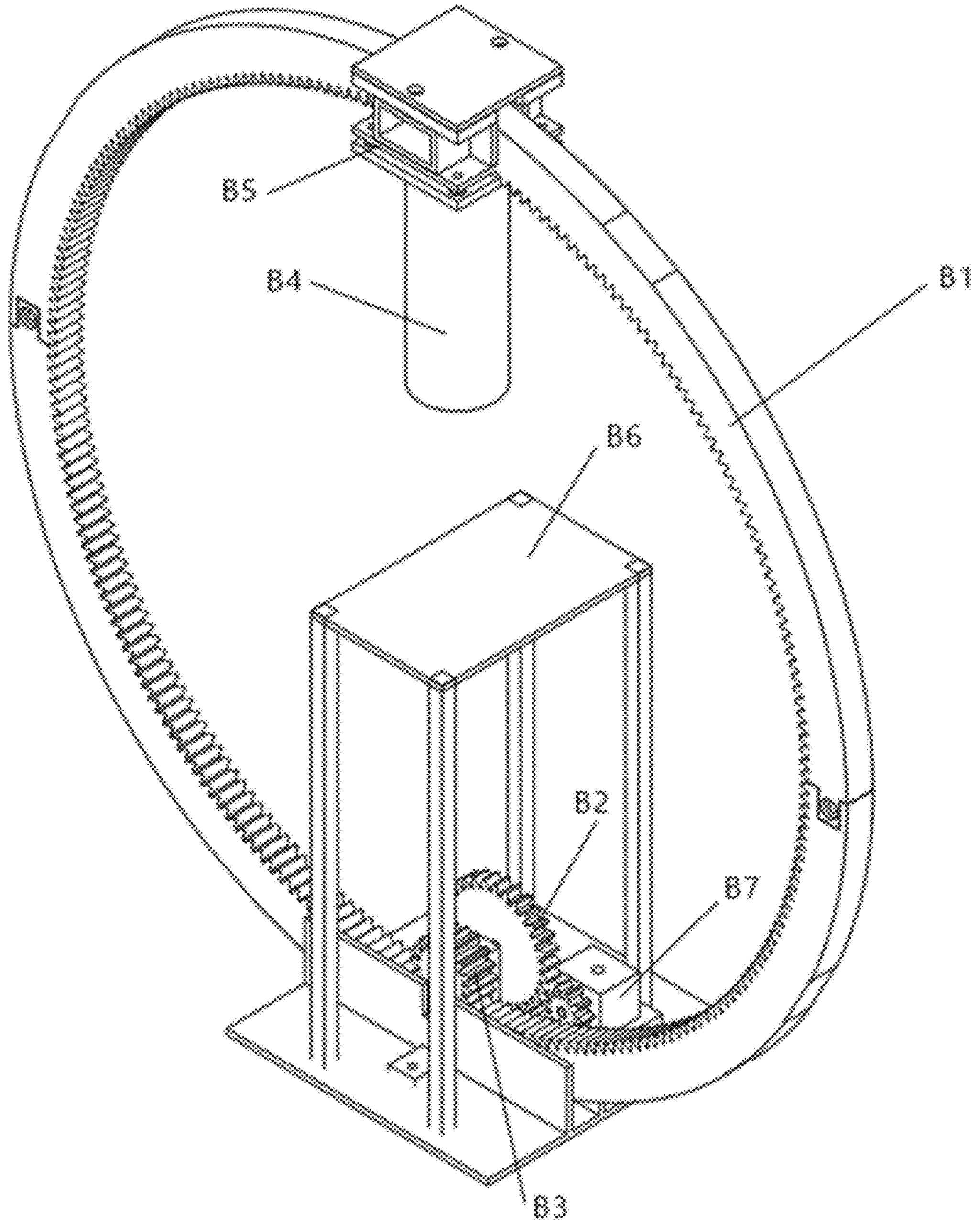
FIG. 9 is an isometric view of an alternative embodiment of FIG. 8.
Figure 10:
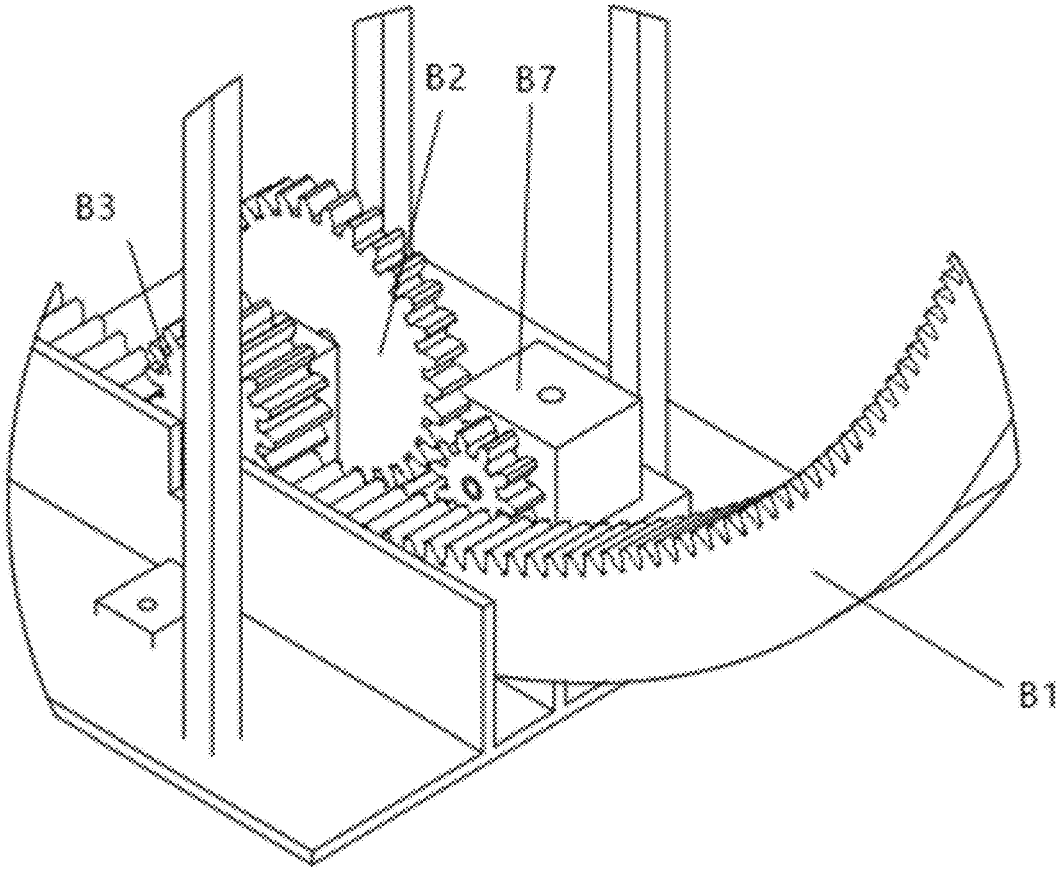
FIG. 10 is a close-up view of the motor and cog assembly moving the track in the alternative embodiment of FIG. 8.

FIGS. 8, 9 and 10 show an alternative embodiment where, instead of rotating the inflorescence and keeping the camera 7 fixed, the inflorescence is fixed and the camera moves in relation to the inflorescence. In the illustrated embodiment the inflorescence is attached to the center of platform B6. The platform B6 can vary in length between about 50-70 mm, can vary in depth between about 60-100 mm, and can be positioned at a height between about 120-160 mm; in a preferred embodiment, the platform is 70 mm long, 100 mm deep, and is positioned at a height of 160 mm. Images are collected by the camera B5 and the lens B4, which rotate around the platform B6. The camera B5 is a high-quality camera similar to the one utilized as the camera 7 described above in the first embodiment. The lens B4 is a microscope objective lens with working distance ranging from about 80-100 mm, diameter ranging from 25-40 mm, and focal length of 80-120 mm; in a preferred embodiment, the lens has a working distance of 100 mm, a diameter of 40 mm, and a focal length of 120 mm. The rotation of camera B5 and lens B4 is achieved by fixing both components to a circular cog track B1, a ring with a diameter of about 280-320 mm; in a preferred embodiment, the track B1 has a diameter of 320 mm. The cog track B1 is moved by the cogs B2 (40-60 mm in diameter) and B3 (20-30 mm in diameter—should be half the size of B2) and driven by the motor B7, causing the camera to rotate around platform B6 as its center of rotation; in a preferred embodiment, the cogs B2 and B3 would have diameters of 60 mm and 30 mm respectively. In an alternate embodiment, the motor is mounted directly onto the camera to move the camera along a fixed circular track, thereby allowing images to be captured in a fashion analogous to the fixed camera mounted on a moving track.

The platform B6 is transparent, which allows the camera B4 to photograph the underside of the flower, which is not possible in the first trichome density scanner embodiment described in FIGS. 1-7. This represents a technical advantage over the design described in FIGS. 1-7, however, the construction of the device described in FIG. 8-10 is more complex, with more moving parts, and so it may be more preferable and practical to use a fixed camera orientation and instead rotate the plant sample. Physically moving the camera also requires the device to be significantly larger than in the original embodiment. All the remaining steps of the process, including photography and machine learning processing, are essentially identical to the design described in FIGS. 1-7.

Figure 12:
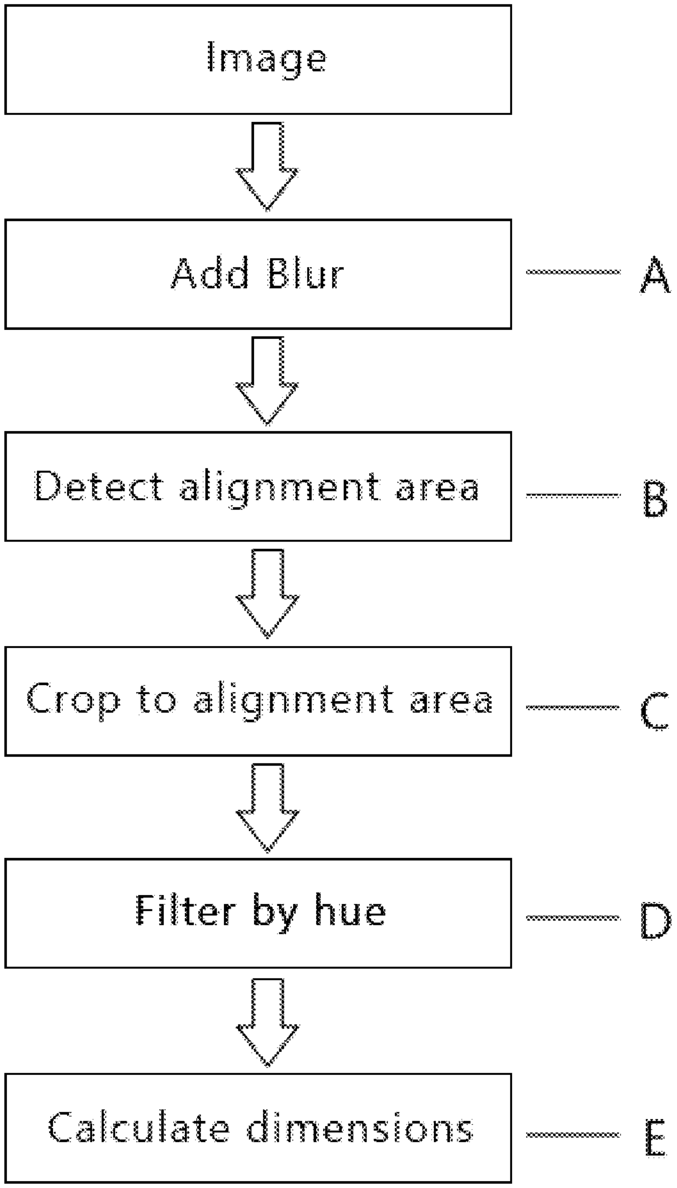
FIG. 12 is a flowchart showing the machine learning algorithm processing steps.

Referring now to the embodiment of FIGS. 1-8, to capture the images to feed into the Image Filtering Algorithm (IFA), the horizontal camera 5 captures an image of the inflorescence, in which the calibration area 3 is visible within the image. The vertical camera 4 then captures an image, in which the calibration area 2 is visible within the image. Both images are individually passed to the filtering algorithm as detailed in FIG. 12. A slight blur is applied to the images in step A to reduce noise prior to image processing. The alignment areas 2 and 3, respectively, are detected in the images at step B and the images are cropped to the alignment dimensions in step C. Because *cannabis* inflorescences are generally limited to green and brown areas of the color spectrum, the algorithm filters hues within those color ranges in step D, interpreting them as white if they match the color range or black if they do not match. The algorithm then takes the largest contiguous area of white in the resulting image and in step E calculates the proportion of space it takes up within the image, which was previously cropped to the known dimensions of the alignment areas 2 and 3. Multiplying the percentage of space taken up within the image by the known dimensions produces a size value for the *cannabis* inflorescence in millimeters.

The IFA algorithm also notes any positional offset of the inflorescence within the alignment area caused by the user not having placed the inflorescence perfectly in the center of the rotating platform 1. This information is used later to determine the distance of the inflorescence from the lens, which will change upon rotation if the inflorescence is not placed perfectly in the center of the platform 1. Although there will be distance variations due to the non-spherical shape of the inflorescence, these variations will be much more pronounced if the inflorescence is off center, and the IFA therefore corrects as many of these variations as possible.

Figure 13:
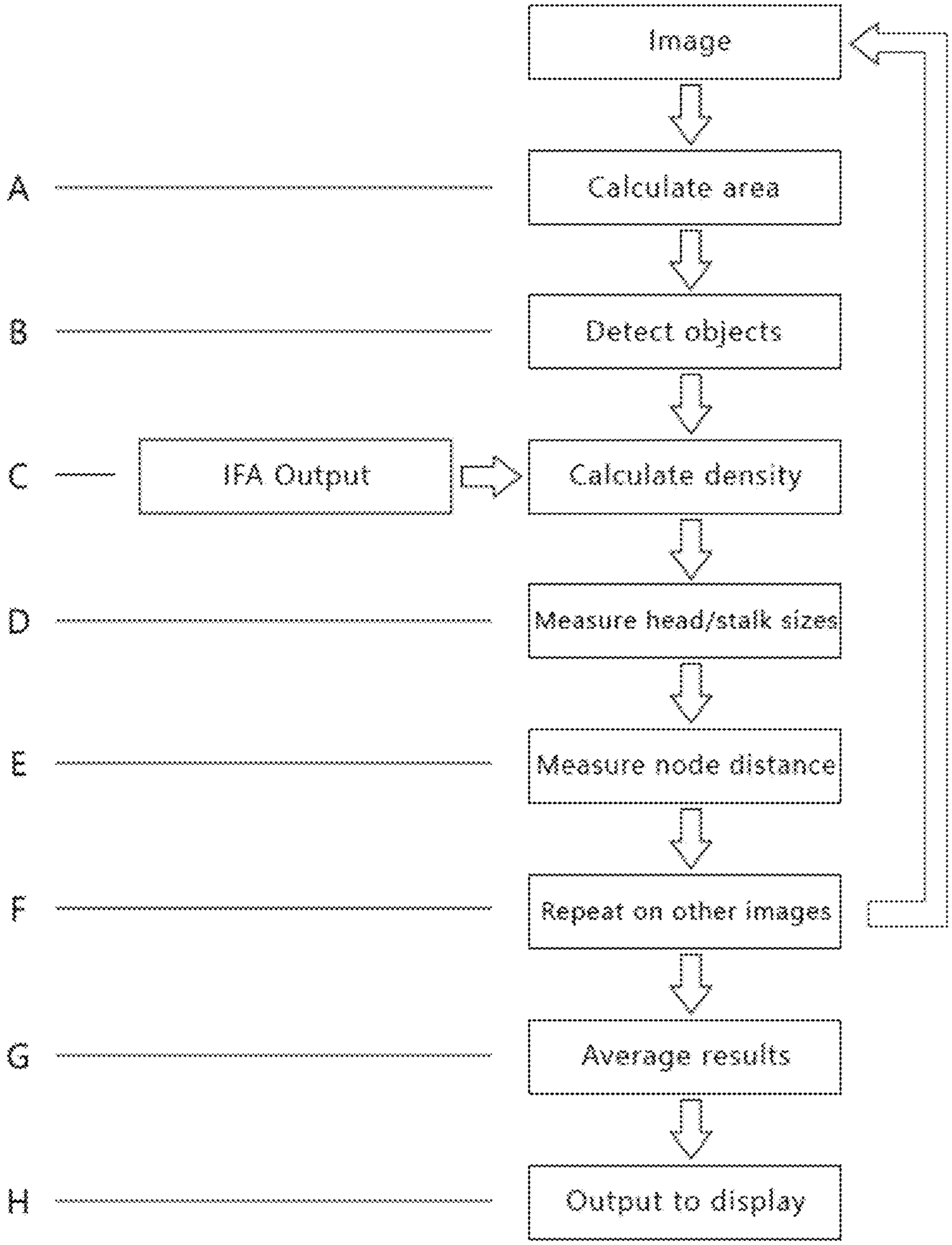
FIG. 13 is a flowchart showing the steps of the camera alignment algorithm.

A Neural Network Machine Learning Algorithm (NNMLA, FIG. 13) that has been trained to detect trichomes within an image runs on the SBC 9. The NNMLA determines the positions of trichomes within the image and the number of detected trichome areas is tallied to determine the total number of trichomes within the image. In step A the scanner first calculates the area of the inflorescence visible in the image from the microscope camera 7 using the equations described below. It then passes image data from both the microscope camera 7 and the side camera 5 (the latter intended for node detection) to a machine learning model. In the preferred embodiment, the model is built on the Inception object detection structure (see: "Going Deeper with Convolutions." Szegedy, C.; Liu, W.; Sermanet, P.; Reed, S.; Anguelov, D.; Erhan, D.; Vanhoucke, V.; Rabinovich, A. 2014, arXiv:1409.4842), but alternative embodiments could be built on similar object detection structures such as ResNet, YOLO, MobileNet or R-CNN. The model has been trained using transfer learning on a custom dataset containing images with trichome heads, trichome stalks, and nodes individually labeled inside rectangular areas.

The IFA and the NNMLA both operate on the same digital image. The IFA determines the alignment of the inflorescence on the platform as it is possible it will not be perfectly centered, and the IFA also determines the overall size of the inflorescence; the NNMLA separately (not using the filtered images from the IFA but instead using the original images) counts trichomes. Then the data from the IFA and NNMLA are both used to calculate trichome density, since one needs to estimate the total surface area of the inflorescence sample in order to accurately estimate trichome density.

In step B the model detects objects by drawing rectangular boxes around trichome heads, trichome stalks, and nodes, and returns rectangular coordinates within the image where it has detected these objects, along with a percentage indicating the confidence of its prediction. In step D the size of the enclosing box around a trichome head is used to approximate the size of the head by calculating the box's area. The same method is used to approximate the height of the trichome stalk. Since the utility of this instrument is primarily based on comparisons of different inflorescence samples (e.g. a cultivar that was grown under different conditions or two different cultivars grown under the same condition, etc.) it does not matter that these are approximations, because the relative measurements of the head diameter and stalk length will matter more than the absolute values.

In step C, after discarding predictions with a low confidence value and areas outside the known dimensions of the visible inflorescence, the number of trichomes detected in the image is divided by the area of the sphere visible within the camera's lens to produce a density value in trichomes per square millimeter. In step D, using the same image, the algorithm takes the distances measured for the trichome head diameter and stalk heights for every detected trichome and computes the average trichome head diameter and average stalk height for the trichomes contained within the image.

In step E, inter-nodal distance is calculated from the image from the side camera 5, instead of the image from the microscope camera 7, and is calculated by determining the distance between two adjacent rectangles tagged as nodes by the machine learning algorithm. These values: trichome density, average trichome diameter, average trichome stalk height, and intermodal distance, are then averaged based on the measurements in the image obtained from microscope camera 7 and the image obtained from the side camera 5. The inflorescence is then automatically rotated on the platform and additional images are captured at different angles and the steps above repeat (step F). Once images at multiple angles have been captured and processed, the results are averaged in step G to produce the final measurements, which are then output to the device's LCD display 11 in step H.

Dividing the number of trichomes detected in the image by the area of the sphere currently visible in the image produces the measurement for the trichome density. To allow for variations in density on the surface of the flower and to reduce measurement errors, multiple calculations are performed by rotating the platform 1 via the stepper motor 10 (see FIG. 1), capturing another image with the camera 7 through the lens 6 and performing the counting operation again on a different portion of the inflorescence's surface. If the user did not place the inflorescence exactly in the center of platform 1, the inflorescence will rotate asymmetrically and be at a different distance from the lens 6 than in the initial image. It is important to consider this difference both in calculating trichome density and also in ensuring the image is in focus. Knowing the initial position of the inflorescence on the platform 1 from the image captured by the camera 4 allows the system to compensate for inaccurate placement of the inflorescence.

Figure 14:
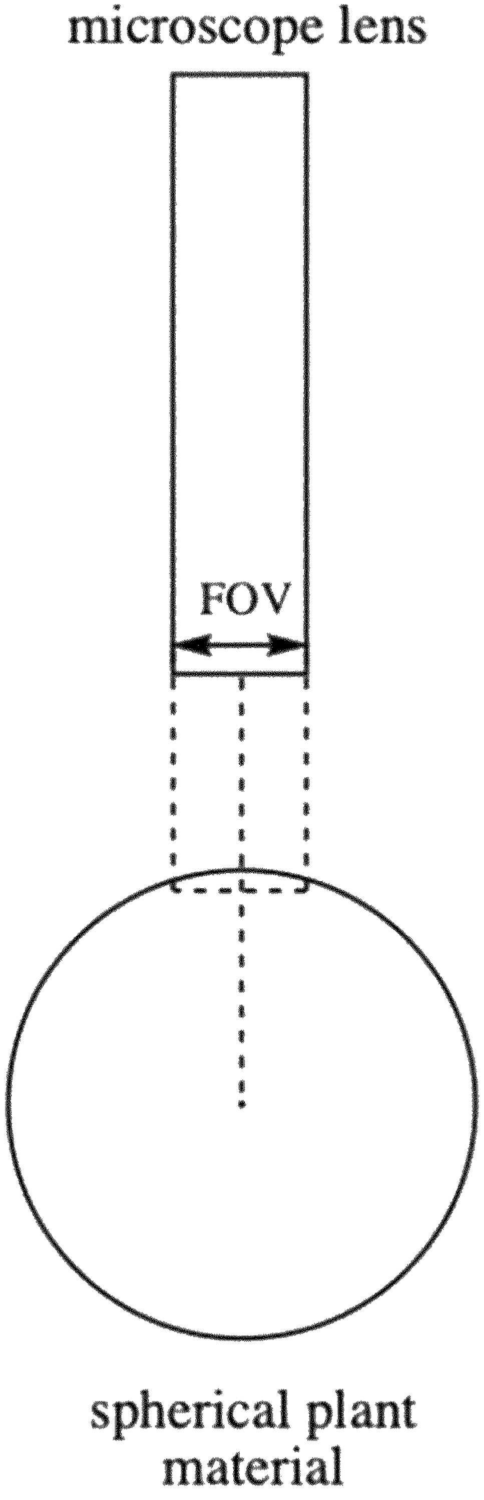
FIG. 14 is a diagram showing how the area of inflorescence visible under the microscope objective lens is treated as a spherical surface.

The surface of the inflorescence is treated as a spherical surface (see FIG. 14). To calculate trichome density, the area of the inflorescence's sphere visible through the lens 6 must be determined. This can be calculated by knowing the documented field of view (FOV) of the lens and the size and position of the inflorescence, as previously determined via the cameras 4 and 5. Given a microscope pointing at an area on the surface of a sphere with radius r, with the FOV given by the equation: FOV=Field Number÷Objective Magnification, to calculate the surface area (SA) of the sphere that is visible within the FOV, 425 we must calculate the surface area of a spherical cap, given by the equation:

$$SA_{cap}=2\pi rh$$

where r=radius of the sphere, and where h=height of the spherical cap.

Figure 15:
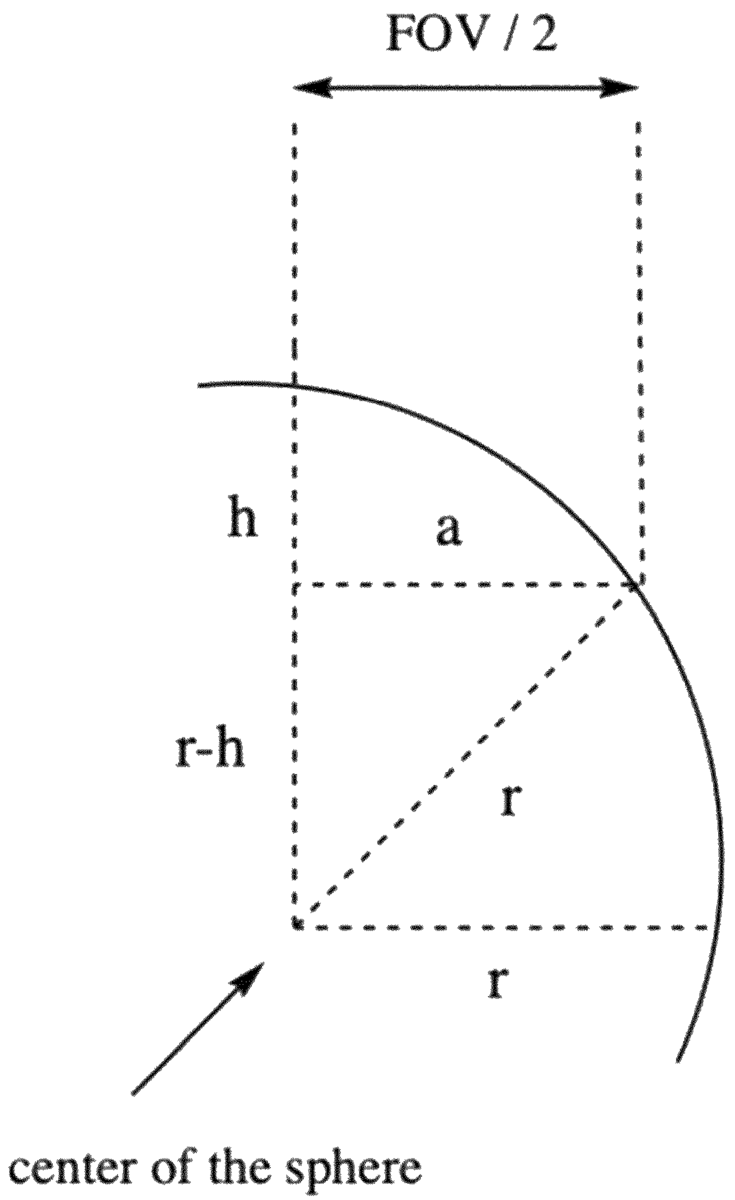
FIG. 15 is a close up view of the diagram of FIG. 14 showing the dimensions used in calculations.

The height of the spherical cap is defined by the FOV of the microscope objective lens, since the cap's diameter is by definition the visible distance across the cap, therefore the FOV=diameter of the spherical cap (see FIG. 15). To solve for the height, h, consider a triangle with one vertex at the center of the sphere, a second vertex at the surface of the sphere at one edge of the FOV, and the third vertex at the top of a line drawn between the center of the sphere and the top of the sphere at a 90° angle, such that the length of the line between the center of the sphere and the third vertex is equal to r-h (see FIG. 14). If FOV/2=distance a, the sides of the triangle are defined by the lines a, r-h, and r. To find the surface area of the spherical cap, we must solve for h using the Pythagorean theorem:

$$(r-h)^2+a^2=r^2$$

$$(r-h)^2=r^2-a^2$$

$$r-h=\sqrt{r^2-a^2}$$

$$\therefore h=-\sqrt{r^2-a^2}+r$$

For example, if the objective lens for a microscope is 10×/22 and the objective magnification is 40, then FOV=(10*40)/22=0.055 mm. Therefore, if a=0.055 mm/2=0.0275 mm, and if the inflorescence sample has a diameter of 1 cm, the radius r=5 mm. To solve for h:

$$h=-\sqrt{(5\text{mm})^2-(0.0275\text{mm})^2}+5\text{ mm}$$

$$h=-\sqrt{25\text{mm}^2-0.000756\text{mm}^2}+5\text{ mm}$$

$$h=-\sqrt{24.999244\text{mm}^2}+5\text{ mm}$$

$$h=-4.999244\text{ mm}+5\text{ mm}$$

$$\therefore h=0.000756\text{ mm}$$

and since:

$$SA_{cap}=2\pi rh$$

$$SA_{cap}=2\pi\times 5\text{ mm}\times 0.0000756\text{ mm}$$

$$SA_{cap}=0.002375\text{ mm}^2$$

$$0.002375\text{ mm}^2=\left(\frac{1\times 10^6\ \mu\text{m}^2}{1\text{ mm}^2}\right)=2375\ \mu\text{m}^2$$

Trichome density (TD), defined as number of trichomes per surface area:

$$\text{TD}=\text{number of trichomes}\div\text{mm}^2$$

TD would therefore be calculated by counting the number of trichomes in the FOV, and dividing that number by $SA_{cap}$. For example, if 10 trichomes were detected in the FOV using the lens in the example above, the trichome density would be:

$$\text{TD}=10\text{ trichomes}\div 0.002375\text{ mm}^2$$

$$\text{TD}=1263\text{ trichomes/mm}^2$$

In this case, 314.15 $\text{mm}^2$ is the SA of a sphere with d=1 cm, therefore an inflorescence with 1 cm diameter with TD=1263 $\text{mm}^2$ would be predicted to have 396,821 total trichomes.

FOV may also be calculated for a camera lens from its measured angular field of view (AFOV):

$$AFOV=2\tan^{-1}\left(\frac{h}{2F}\right)$$

where h=length of the sensor and F=focal length of the lens. For example, if the sensor length is 8.38 mm (⅓") and the focal length of the lens is 15 mm:

$$AFOV=2\tan^{-1}\left(\frac{8.38\text{ mm}}{(2\times 15\text{ mm})}\right)$$

$$AFOV=2\tan^{-1}(0.279$$

$$AFOV=31.17°$$

Field of view is then given by the following equation:

$$FOV=2D\tan\left(\frac{AFOV}{2}\right)$$

where D is the working distance (distance from object to sensor).

Figure 16:
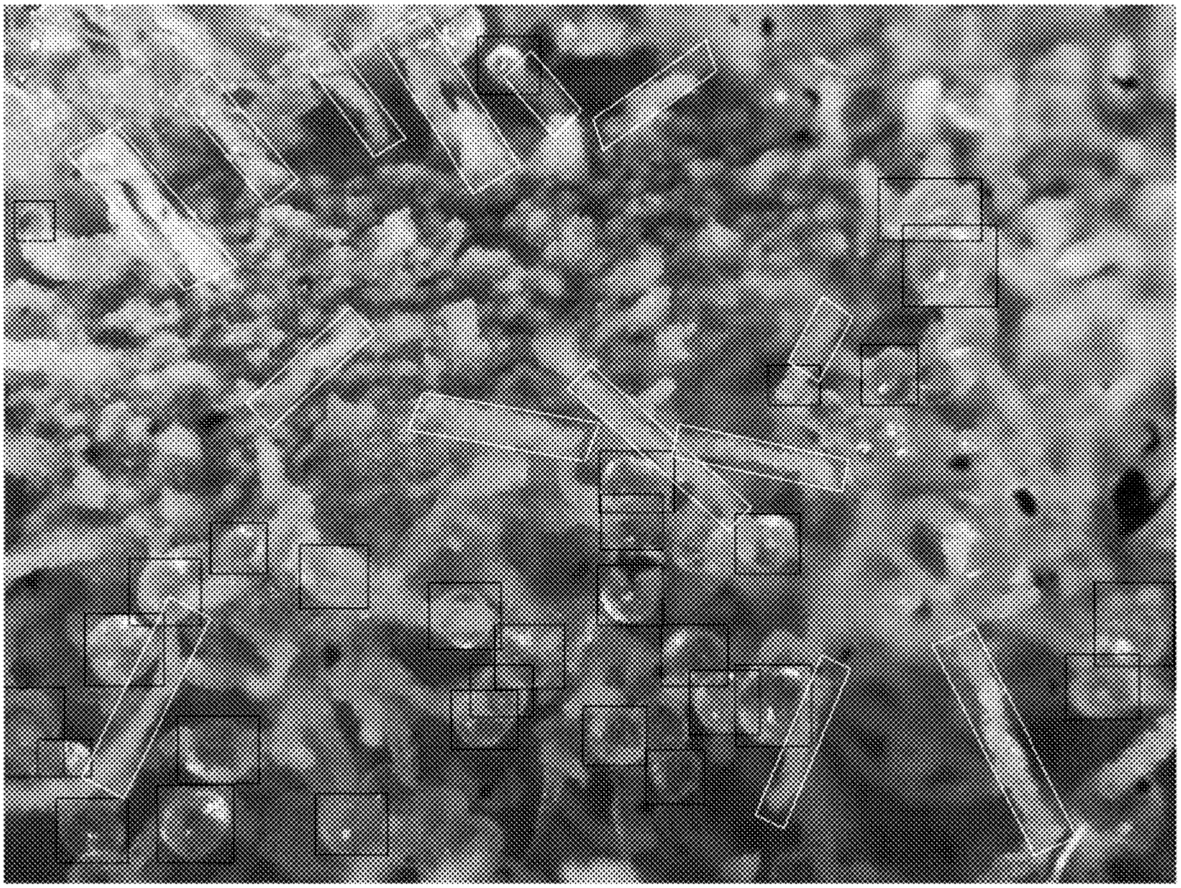
FIG. 16 is a digital image processed by the trichome scanner illustrating how the software identifies trichomes.

FIG. 16 shows an image that has been processed. The black boxes denote each of the trichome heads that have been identified. The white boxes represent the identified trichome stalks.

The following claims are thus to be understood to include what is specifically illustrated and described above, what is conceptually equivalent and what can be obviously substituted. Those skilled in the art will appreciate that various adaptations and modifications of the just-described preferred embodiments can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A system for automatically measuring trichomes on an unaltered plant material, the system comprising:
- a movable platform;
- a motor;
- a first digital camera;
- a second digital camera;
- a computing device; and
- a display; wherein
  - the movable platform is configured to hold the unaltered plant material;
  - the motor is configured to rotate the movable platform;
  - the first digital camera comprises a microscope objective lens and is configured to capture one or more top view images of the unaltered plant material held on the movable platform;
  - the second digital camera is configured to capture one or more side view images of the unaltered plant material; held on the movable platform; and
  - the computing device is connected to the motor, the first digital camera, the second digital camera and the display, and comprises a memory storing instructions, which, when executed by the controller, cause:
- the first camera to capture the one or more top view images;
- the second camera to capture the one or more side view images; and
- the computing device to calculate an average trichome cap diameter and an average stalk height of the trichomes by analyzing trichome morphology information on the one or more top view images and the one or more side view images and to output to the display the calculated average trichome cap diameter and the calculated average stalk height of the trichomes.

2. The system of claim 1 wherein the system is configured to connect to an external computing device.

3. The system of claim 2, wherein the the system is configured to connect to the external computing device via a remote networking interface to a local area network or wide area network.

4. The system of claim 1 further comprising:

a track; and a motor and drive system; wherein:

the track supports the first digital camera; and the motor and drive system is configured to change the distance of the unaltered plant material relative to the first digital camera.

5. The system of claim 4, further comprising a camera-mounted motor enabling the camera to move along the track.

* * * * *